Dec. 23, 1952   S. AMAR   2,623,149
ICE-CUTTING DEVICE
Filed May 29, 1950
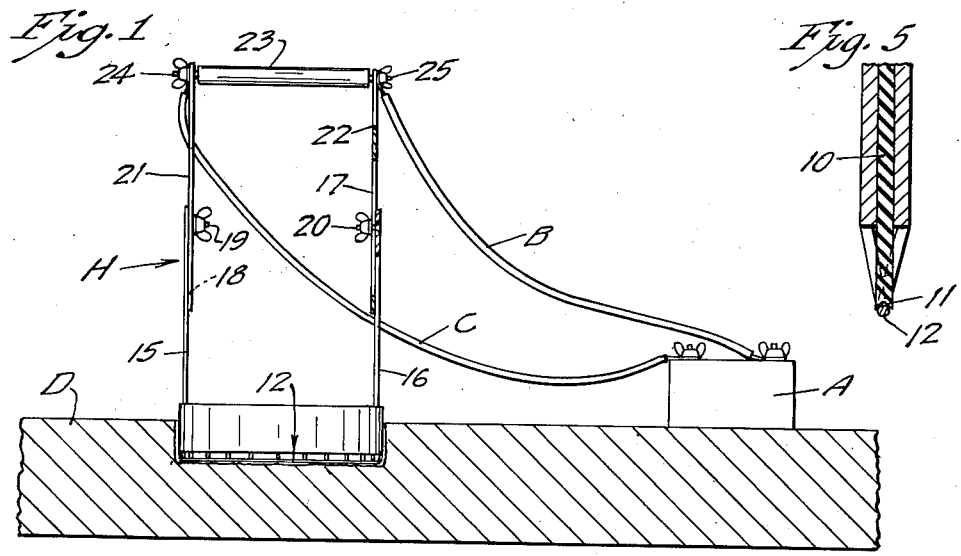
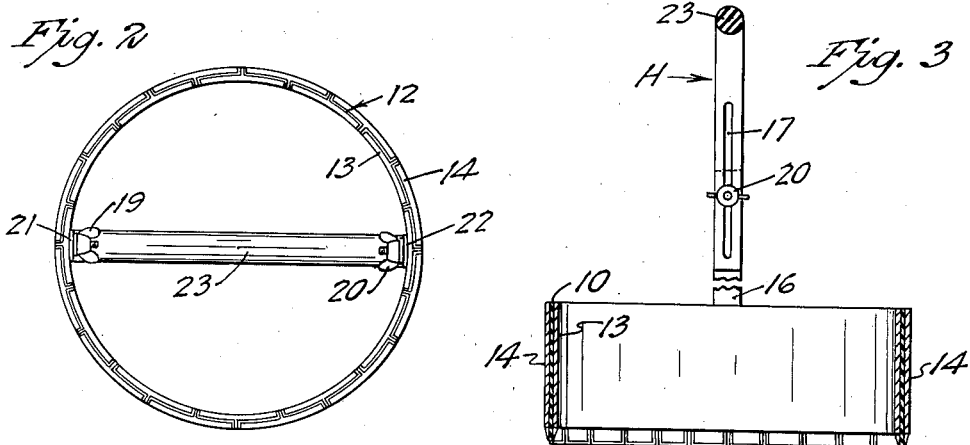
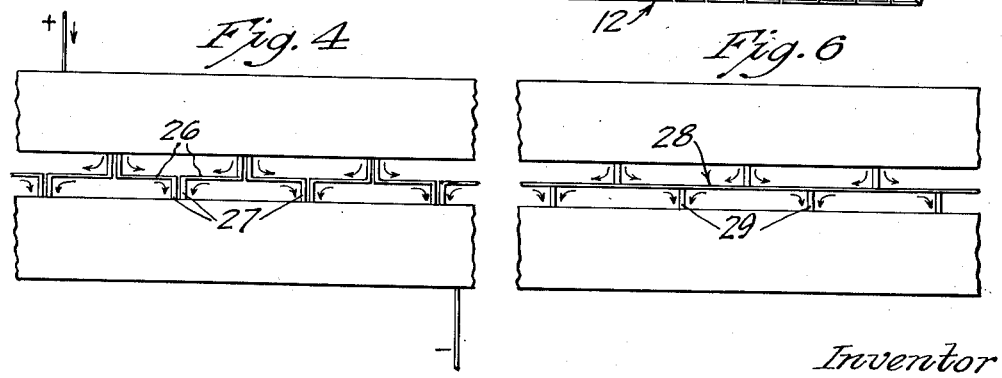
Inventor
Shafeek Amar
By Williamson & Williamson
Attorneys Patented Dec. 23, 1952

2,623,149

UNITED STATES PATENT OFFICE 2,623,149

ICE-CUTTING DEVICE

Shafeek Amar, Minneapolis, Minn.

Application May 29, 1950, Serial No. 164,912

5 Claims. (Cl. 219—19)

This invention relates to ice cutting devices. More specifically it relates to devices designed for use by fishermen in cutting a fishing hole in the ice through which to fish.

The enjoyment experienced by fishermen in fishing through the ice during the winter has always been substantially dampened by the laborious task of chopping a hole in the ice before such fishing can be accomplished. A considerable number of devices have been designed previously to obviate or substantially reduce the time and effort consumed in cutting such a hole prior to fishing. None of these devices have proved entirely satisfactory, in that many require the transportation of a considerable amount of equipment. Others have proved ineffective in that once the heating element used to melt the ice has descended a short distance downwardly therethrough so as to come in contact with ice water formed thereby, they are no longer able to produce the heat necessary to melt the ice further. Previous electrical heat elements used for this purpose have required a high voltage electrical potential in order to be effective for the purpose for which they were designed.

It is a general object of my invention to provide an ice cutting device capable of effectively cutting through ice even when being used in conjunction with a low voltage source of electricity.

A more specific object is to provide an ice cutting device for fishermen constructed to quickly and efficiently cut a fishing hole in the ice when connected with a battery of the type ordinarily used in an automobile.

These and other objects and advantages of my invention will more fully appear from the following description made in connection with the accompanying drawings, wherein like reference characters refer to similar parts throughout the several views and, in which:

Fig. 1 is a side elevational view of one embodiment of my invention being used in conjunction with a storage battery to cut a hole through ice;

Fig. 2 is a bottom elevational view of the device;

Fig. 3 is a vertical sectional view of the ice cutting device;

Fig. 4 is a fragmentary bottom plan view on an enlarged scale of the bottom of the device laid out flat to show the electrical hookup of the heating element;

Fig. 5 is a fragmentary vertical sectional view on an enlarged scale of the lower peripheral edge of the device; and Fig. 6 is a fragmentary bottom plan view on an enlarged scale of the bottom of another embodiment of my invention laid out flat showing the electrical hook-up of the heating element.

One embodiment of my device is shown in Fig. 1 connected to a storage battery A by means of insulated wires B and C and cutting a hole in a layer of ice D.

As shown in Figs. 1–5 one embodiment of my device includes a substantially cylindrically shaped support frame 10 of rigid non-conducting material. This support frame 10 is hollow and has a lower peripheral edge 11 which acts as a support for the heating element indicated generally as 12. Secured by a non-conducting adhesive or in some other suitable manner to the inner surface of the support frame 10 is a concentrically formed hollow cylindrically shaped inner-conducting element 13. Similarly formed but of slightly larger diameter is an outer-conducting element 14 which is secured circumferentially to the support frame 10 as best shown in Fig. 2. The lower peripheral edge 11 of the support frame 10 extends downwardly below the lower edges of the inner-conducting element 13 and the outer-conducting element 14 as best shown in Figs. 3 and 5.

A handle structure indicated generally as H is provided for the guidance of the device and for making available thereto a source of electrical power. The handle structure H is comprised of a pair of upstanding rigid metal straps 15 and 16. The metal strap 15 is welded or otherwise suitably secured to the upper edge of the outer-conducting element 14 and the metal strap 16 is similarly connected to the upper edge of the inner-conducting element 13. Each of these straps 15 and 16 is provided with a longitudinally extending slot 17 and 18 in its upper portion. The slots 17 and 18 carry a wing bolt 19 and 20 which secures thereto a pair of metal straps 21 and 22. The metal straps 21 and 22 are connected at their upper ends by transverse tube 23 which is made of insulating material or other suitable non-conductor. Each of the straps 21 and 22 is provided with a pair of wing bolts 24 and 25 which are adapted to secure the insulated wires B and C thereto.

The heating element shown in Figs. 1–5 is comprised of a plurality of spaced aligned wire segments 26 of relatively small diameter and of high resistance. These wire segments 26 are arranged so as to extend in a circle concentric to and immediately below the support frame 10. The opposite ends of each of the segments 26 are connected to the inner-conducting element 13 and the outer-conducting element 14 by conducting leads indicated generally as 27. These conducting leads are of relatively low resistance and of relatively large diameter. The manner in which the segments 26 are electrically connected to the inner-conducting element 13 and the outer-conducting element 14 is best shown in Fig. 4.

The heating element indicated generally as 28 in Fig. 6 is a continuous wire of similar material and dimensions as that from which the wire segments 26 shown in Fig. 4 are formed. The wire element 28 is alternately connected at spaced intervals to the inner-conducting element 13 and the outer-conducting element 14 by a plurality of conducting leads 29 which are formed of material and dimensions similar to the conducting leads 27. The manner of electrical connection for the heating element 28 is best shown in Fig. 6.

In operation, the handle structure indicated generally as H is connected to the battery A or to the battery in an automobile (not shown) by means of the insulated wires B and C. As soon as this electrical connection is established the device is ready for use in cutting a hole through the ice D. The parallel electrical hookups shown in Figs. 4 and 6 will cause the wire segments 26 and the heating element 28 to immediately raise to a high temperature. Since the conducting leads 27 and 29 are of low resistance there is very little drop in electrical potential over the ends of these leads. Since the wire segments 26 are connected in parallel, the same electrical potential is available over each of them. The fact that they are very short in length insures that the total resistance offered by each of these segments 26 is relatively small with the result that the electrical potential provided by the battery A is sufficient to maintain these segments at a high temperature despite the cooling attendant with the melting of ice thereby. The high resistance of each of the wire segments 26 causes some of the electric current passing therethrough to be converted into heat. It is this heat, of course, which is effective in melting the ice.

By placing the device upon the ice as shown in Fig. 1 the heating elements 12 and 28 are brought in direct contact with the ice. Because of the small diameter of the heating elements 12 and 28 and because of their shape the operator is assured that the current which passes therethrough will always be passing through the portion in direct contact with the ice. This is not true with devices which have relatively large heating elements, since it has been found that in many of these devices the portion of the heating element which is in direct contact with the ice remains relatively cool and the bulk of the current passes through a portion of the heating element not in direct contact with the ice. Such a device, of course, is necessarily inefficient. I have found that by constructing my heating element as shown there is no material loss of time in melting the ice after the heating element has once become immersed in the ice water formed as a result of the melting of the upper portion of the ice.

As the heating elements 12 and 28 melt the ice the device, of course, because of its own weight, continues to descend through the ice D. The heat generated by the heating elements 12 and 28 is sufficient to melt a circle of ice of sufficient width to accommodate the support frame 10 and the inner and outer-conducting elements 13 and 14. As a result, the entire device will move downwardly until a section of ice the shape of the inner-conducting element 13 has been cut free.

Once the section of ice has been cut free from the layer of ice D my device can be easily withdrawn upwardly and the free section of ice easily removed from the layer of ice D. Thus the fisherman is provided with a hole of the desired diameter at a substantial saving of time and effort.

It should be noted that the support frame 10 provides a support for the heating elements 12 and 28. By disposing the heating elements 12 and 28 immediately below the lower peripheral edge 11 of the support 10 the heating elements are provided with the necessary rigid background to preclude their assuming different shapes while being maintained at high temperatures by the current passing therethrough. The support frame 10 assures the operator of the device that his heating element 12 or 28 will at all times remain in its proper position.

It should be noted that the heating element 28 disclosed in Fig. 6 is electrically connected to provide a parallel connection through a slightly different arrangement from that shown in Fig. 4. My preferred embodiment is in Fig. 4 but the embodiment shown in Fig. 6 is also effective in cutting a hole in the ice when mounted in a manner similar to that shown for the heating element 12.

It should be noted that I have provided an ice cutting device for use by fishermen which permits him to use a low voltage source of electrical power to form the necessary hole in the ice. This is a distinct advantage over ice cutting devices previously known especially since it is a common practice for ice fishermen to drive their automobiles on to the ice and to fish nearby the parked vehicle. It is a simple matter for the fisherman to connect my device to his automobile battery, quickly and easily cut his fishing hole in the ice and thereafter proceed to enjoy fishing.

It will, of course, be understood that various changes may be made in the form, details, arrangement and proportions of the various parts without departing from the scope of my invention.

What I claim is:

1. A low voltage ice cutting device comprising a non-conducting support frame of predetermined shape and having a lower peripheral edge, an electrical heating element supported by said frame and disposed beneath said lower peripheral edge and adjacent thereto, said heating element including a plurality of spaced, aligned, and relatively short segments of wire of high electrical resistance, and means for connecting said heating element to a source of electrical power.

2. A low voltage ice cutting device comprising a non-conducting support frame of predetermined shape and having a lower peripheral edge, an electrical heating element disposed beneath said lower peripheral edge and adjacent thereto, said heating element including a plurality of spaced, aligned, and short segments of wire of high electrical resistance, and means connecting said segments of wire into a parallel electrical hookup system whereby each of said segments may be electrically connected in parallel when said heating element is connected with a source of electrical power.

3. A low voltage ice cutting device comprising a non-conducting support frame of predetermined shape having a peripheral edge and a heating element adjacent said peripheral edge and supported thereby, said heating element including a plurality of spaced, aligned segments of wire of high resistance longitudinally aligned along said peripheral edge, and including a plurality of short electrical conducting leads of low resistance, each of said conducting leads having one of its ends connected to one end of one of said wire segments, means for connecting the other end of said conducting leads to a pole of a source of electrical power opposite to the pole to which the other end of the wire may be connected whereby said wire segments will be connected in parallel to the same source of electrical power.

4. A fisherman's low voltage ice cutting device comprising an upright non-conducting support frame of substantially cylindrical shape having a lower peripheral edge, an outer-conductor element substantially concentrically formed relative to said support frame and secured to the outer surface thereof, means for electrically connecting said element to one pole of a source of electrical power, an inner-conductor element substantially concentrically formed relative to said support frame and secured to the inner surface thereof, means for electrically connecting said inner-conductor element to the opposite pole of said source of electrical power, said peripheral edge being disposed a short distance below said elements, a plurality of electrical heating elements adjacent said peripheral edge and supported thereby, said heating elements being connected in parallel with said conductor elements whereby said heating elements will effectively cause any ice with which they may be placed in contact to melt rapidly when said conductor elements are electrically connected to a source of electrical power.

5. The structure defined in claim 4, and a handle structure connected to said inner and outer-conductor elements, a portion of said handle structure constituting said first mentioned means and another portion of said handle structure constituting said second mentioned means.

SHAFEEK AMAR.

REFERENCES CITED

The following references are of record in the file of this patent:

UNITED STATES PATENTS

| Number | Name | Date |
| --- | --- | --- |
| 956,604 | Savoy | May 3, 1910 |
| 1,477,631 | Deenihan | Dec. 18, 1923 |
| 1,584,921 | Gee et al. | May 18, 1926 |
| 1,785,078 | Gibson | Dec. 16, 1930 |
| 1,947,740 | Robinson | Feb. 20, 1934 |
| 1,977,608 | Blystone | Oct. 23, 1934 |
| 2,111,251 | Spilsbury | Mar. 15, 1938 |
| 2,156,332 | Ayers | May 2, 1939 |
| 2,234,129 | Pfeil | Mar. 4, 1941 |
| 2,250,602 | Pierce | July 29, 1941 |
| 2,282,546 | Schwimmer | May 12, 1942 |
| 2,316,282 | Pfeil | Apr. 15, 1943 |
| 2,505,647 | Norris | Apr. 25, 1950 |